United States Patent Office 2,807,546
Patented Sept. 24, 1957

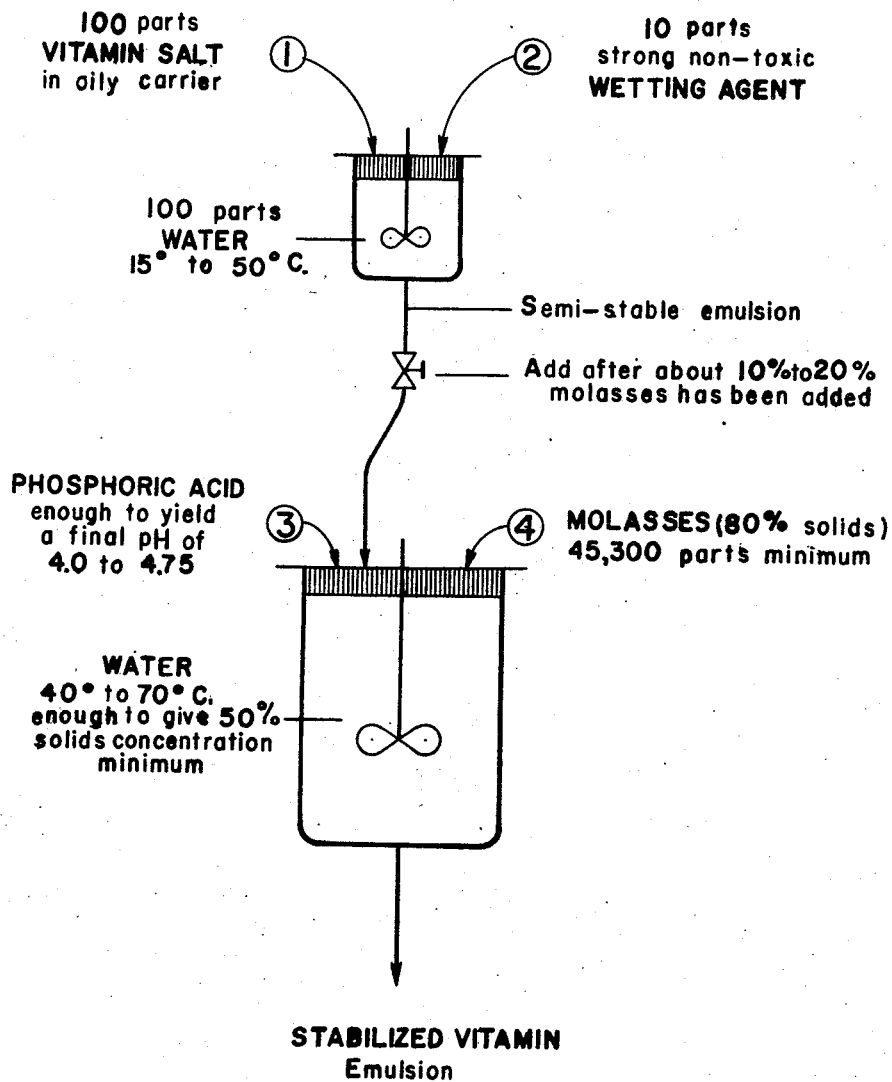

2,807,546

VITAMIN ADDITIVES

Philip C. Anderson, Crete, Nebr., and Frank N. Rawlings, Ogden, Utah

Application December 9, 1953, Serial No. 397,234

5 Claims. (Cl. 99—6)

This invention relates primarily to feed supplements for animals and especially those of the type that include molasses. Such feed supplements, when fed to ruminants along with certain roughages that are low in vitamin A, require a fortifying of the feed supplement with vitamin A, and it is also desirable to fortify the supplement with other vitamins. Some of the vitamins to be used are water-insoluble but oil soluble and come onto the market in an oily or fatty carrier, so it is an object of this invention to devise ways and means for thoroughly dispersing the fortifying vitamins in the molasses-bearing feed supplement in the form of a stable emulsion.

Another object is to protect the highly-reduced vitamins from oxidation so that they do not substantially lose their potency, especially when mixed with dry feeds. Another object is to preclude such oxidation without the incorporation of an enveloping insoluble substance around the oily vitamin. Yet another object is to incorporate into the emulsion a synergistic anti-oxidant. Still another object is to realize the foregoing objects in a manner whereby the feed supplement is not rendered unpalatable to the ruminant. And a further object is to combine the desired vitamins into a feed supplement of a particular type that contains normally vitamin-oxidizing constituents.

This invention, then, in its simplest form, comprises forming a separate concentrated semi-stable emulsion of the vitamin salt in an oily carrier, by mixing in a non-aerating agitator, about the same quantity of warm water and a strong non-toxic palatable wetting agent. These components are supplied to a first or preliminary agitator and stirred until a semi-stable emulsion is produced.

Next, the semi-stable emulsion drawn from the first agitator is stirred into a watery mixture of molasses and phosphoric acid in a second agitator for effecting in the latter mixture an emulsion that is stable, suitable for contributing to the nutritional needs of the animal; and at the same time protected against oxidation or loss of potency. More particularly, this latter is accomplished by the presence in solution of molasses and a phosphorus-bearing chemical in quantity to give a critical final pH to the emulsified mixture.

The formation of the concentrated semi-stable vitamin-bearing emulsion as well as the stabilization thereof and the protection of its vitamins, have to take place under critical conditions. The requisite steps are as follows: to 100 parts of water at a temperature of from 15° C. to 50° C. there are added to a primary non-aerating agitator, first, 100 parts of a oil-soluble vitamin salt in solution in its oily or fatty carrier; and second, 10 parts of a strong non-toxic water-soluble wetting agent. After being well agitated together, there results a concentrated a semi-stable vitamin emulsion. Into another or secondary non-aerating agitator is incrementally added molasses (having preferably 80% solids) in minimum quantity of 45,300 parts, to water at a temperature of from 40° C. to 70° C. in quantity to give the mixture a minimum solids concentration of 50%, and enough phosphoric acid to yield a final pH of from 4.0 to 4.75. The parts are measured on a weight basis. After about 10% to 20% of the molasses has been stirred preliminarily into the mixture in the secondary agitator, the semi-stable emulsion from the primary agitator is then supplied to the secondary agitator while the remainder of the molasses is added, and the mixture thoroughly agitated. After all the molasses has been added and stirred there can be drawn from the secondary agitator, a stabilized vitamin emulsion with the high potency of its highly reduced vitamins protected against oxidation. The preferred wetting agent is called Tween 80 (Polyoxyethylene sorbitan) and is made and sold by the Atlas Powder Company of Wilmington 9, Delaware; or there can be used Nytron (a complex organic sulfonate whose hydrocarbon portion is derived from petroleum), made and sold by Allied Chemical & Dye Corporation, Nitrogen Division, of 40 Rector Street, New York 6, New York. Phosphoric acid may have substituted for it, its water-soluble phosphates, and it is better to stir most of the phosphoric acid into the mixture in the secondary agitator before molasses is added. The vitamin salt in the oily carrier may also contain some synergistic anti-oxidant such as a tocopherol or mixed tocopherols, for assisting as an anti-oxidant protector of the vitamin A salts, prior to being consumed as feed by the animal using the final emulsion in a feed supplement. This anti-oxidant protection is also afforded by the phosphoric acid encountered in the secondary agitator. Nevertheless, the tocopherol is useful in the blood-stream of the animal as well as in its paunch or rumen. If tocopherol is added, it can be added on the basis of 67 parts tocopherol to 33 parts vitamin salt, although tocopherol need not be added in excess of 100 parts to 100 parts of vitamin salt. When tocopherol is used and the semi-stable emulsion is not to be added immediately to the mixture in the secondary agitator and particularly the phosphoric acid, some ascorbic acid must be added to the mixture of vitamin salt and tocopherol. The reason is that unless the vitamin salt in its oily carrier is shortly to be mixed with the phosphoric acid which also acts as an anti-oxidant for the oily substances to effect a decrease in their rate of oxidation, the synergistic combination of tocopherol and ascorbic acid will decrease the rate of oxidation of the oily substance until that substance does reach the phosphoric acid stabalant environment in the secondary agitator. The quantity of ascorbic acid used should be of the order of 2 grams for each 50 grams of vitamin salts, but this can be increased or decreased depending upon the time of oxidative exposure of the semi-stable emulsion, prior to its incorporation into the mixture in the secondary agitator. There is no optimum oil-ascorbic acid ratio. The vitamins used may be A, D, and water-soluble C.

The addition of part of the molasses to the secondary agitator before adding the fortifying vitamin semi-stable emulsion serves to render that semi-stable emulsion stable as it is diluted into the larger body of liquid. Once the vitamins are dispersed in the larger body of liquid, the molasses serves not only to make the emulsion permanent, but also to protect the highly-reduced vitamins from being oxidized by the oxidants present in the feed supplement, for thus assuring retention of their high potency.

One important use of the stabilized vitamin emulsion is for incorporation into the feed supplement described in our co-pending patent application Serial No. 372,774, filed August 6, 1953, now Patent No. 2,748,001 of May 29, 1956. It is composed of molasses, urea, and phosphoric acid, in critical proportions.

The constituents of that ruminant feed supplement are as follows: phosphoric acid in quantity of from 135 to 300 grams per 100 pounds of supplement; urea in quantity of from 2% to 20% by weight of the supplement with the trace minerals included in this addition; molasses in quantity of 55% or more of the supplement; and water at from 40° C. to 70° C. in quantity of about 3% by weight of the supplement, or from 135 grams to 300 grams per 100 pounds of the total ration.

The feed supplement is liquid and readily consumed by the ruminant, thus supplementing the carbohydrate roughage of grain, grain products, straw, bagasse, hay, annual grasses, corn cobs, and the like. It has been found that if the ruminant is given free choice of its total ration, the roughage will comprise from 90% to 78%, while the supplement will comprise from 10% to 22%, on a weight basis. The ruminant will adjust the ration to result with an optimum nitrogen concentration of between 1.28% and 1.44% of the total dry weight consumed, (8% to 9% protein equivalent). By "oily carrier" is meant those fatty acid compounds capable of dissolving the oil-soluble vitamins, and which components are commonly used in commerce for this purpose. By "wetting agents" is meant those non-toxic wetting agents that are capable of oil-in-water emulsion of the oils commonly in commerce carrying the oil-soluble vitamins.

Steps for carrying out this invention are shown in the accompanying flow-sheet drawing.

We claim:

1. The process of producing a stabilized vitamin emulsion as a feed addition for ruminants, which comprises stirring together in a non-aerating agitation zone a preparatory separate smaller mixture of approximately 100 parts of water at a temperature of 15° to 50° C. with a substantially equal quantity of a water-insoluble vitamin in oil solution and as little as about 10 parts of a non-toxic ruminant-palatable water-soluble wetting agent until a concentrated semi-stable oil-water emulsion thereof is formed as a separate first step, stirring in a separate secondary non-aerating agitation zone a larger mixture of water at a temperature of 40° to 70° while incrementally adding thereto molasses up to a total quantity of the order of 45,000 parts whereby in the completed mixture there are at least 50% solids and also adding thereto phosphoric acid sufficient to give a pH to the final mixture of 4.0 to 4.75, so used to protect the highly reduced vitamins against oxidation, meanwhile after about 10% to 20% of the molasses has been added to the larger mixture incrementally adding thereto to blend therewith the concentrated semistable emulsion from the preparatory smaller mixture, and finally withdrawing from the combined mixture a liquid stabilized emulsion having a bitter taste palatable to ruminants and bearing a content of highly-reduced vitamins of high potency dispersed and preserved by the molasses and the phosphoric acid against oxidation by any oxidants encountered in their environment and subsequently in feed consumed by a ruminant.

2. The process according to claim 1, wherein the phosphoric acid is supplied and agitated into the larger mixture before the molasses is added, whereby there is established in the secondary agitation zone an oxidation-deterrent environment for the concentrated unstable oil-water emulsion from the preparatory agitation zone then blended into the molasses.

3. The process according to claim 1, wherein an additional anti-oxidant is supplied during agitation of the major mixture in the secondary agitation zone which antioxidant includes tocopherol in quantity not substantially in excess of the vitamin present.

4. The process according to claim 1, wherein there is also supplied to the major agitation, ascorbic acid.

5. The process according to claim 1, with the addition of adding the said stabilized vitamin-protected emulsion into a liquid feed supplement whose constituents exclusive of the stabilized emulsion comprise a mixture of phosphoric acid in quantity of from 135 to 300 grams per 100 pounds of supplement to give a pH of 4.0 to 4.75, urea in quantity of from 2% to 20% by weight of the supplement, molasses in quantity of 55% or more of the supplement, and water at from 40° C. to 70° C. in quantity of about 3% by weight of the supplement, whereby the feed supplement is given a vitamin additive both of which are compatible with each other while both are palatable to a ruminant and in which supplement the vitamins remain potent.

References Cited in the file of this patent

UNITED STATES PATENTS

| Re. 23,815 | Reerink et al. | Apr. 20, 1954 |
| 2,321,400 | Lubarsky | June 8, 1943 |
| 2,603,567 | Stiles | July 15, 1952 |
| 2,628,930 | Zentner | Feb. 17, 1953 |
| 2,650,895 | Wallenmeyer et al. | Sept. 1, 1953 |
| 2,656,274 | Tiedt et al. | Oct. 20, 1953 |
| 2,694,668 | Fricke | Nov. 16, 1954 |

FOREIGN PATENTS

| 24,038 | Great Britain | of 1896 |